United States Patent [19]

Edwards

[11] Patent Number: 4,602,686

[45] Date of Patent: Jul. 29, 1986

[54] MOBILE MACHINE FOR UPROOTING VEGETATION FROM THE GROUND

[76] Inventor: John W. Edwards, P.O. Box 1151, Brandon, Fla. 33511

[21] Appl. No.: 577,297

[22] Filed: Feb. 6, 1984

[51] Int. Cl.$^4$ ............................................. A01D 17/04
[52] U.S. Cl. .................................... 171/111; 171/123; 171/133; 172/554
[58] Field of Search ...................... 171/7, 4, 25, 27, 63, 171/139, 144, 142, 111, 71, 73, 74, 76, 84, 85, 89, 10, 32, 17, 50, 53, 123, 133; 172/540, 677, 65, 679, 680, 68, 33, 554, 67, 552, 32, 28, 122, 143, 112, 148; 280/492; 37/126 R, 190, 126 AD, 127, 128, 129, 8; 308/245, 41

[56] References Cited

U.S. PATENT DOCUMENTS

| | | | |
|---|---|---|---|
| 703,707 | 7/1902 | Moran | 171/144 X |
| 1,276,843 | 8/1918 | Wentworth | 171/4 X |
| 1,594,789 | 8/1926 | May et al. | 172/540 |
| 2,524,871 | 10/1950 | Andrus | 172/33 X |
| 2,546,786 | 3/1951 | Rowe | 171/139 X |
| 2,742,839 | 4/1956 | Davidson et al. | 171/109 |
| 2,754,736 | 7/1956 | Lynn | 172/67 X |
| 2,912,264 | 11/1959 | Peck | 308/245 X |
| 3,126,653 | 3/1964 | Bourgeous | 172/33 |
| 3,316,977 | 5/1967 | Snook | 171/25 |
| 3,343,287 | 9/1967 | Kiras | 37/129 |
| 3,627,051 | 12/1971 | Schmitz et al. | 171/133 |
| 3,633,677 | 1/1972 | Walker | 171/27 |
| 3,650,334 | 3/1972 | Hagenstad | 172/540 |
| 3,986,727 | 10/1976 | Cox | 280/492 |
| 4,317,300 | 3/1982 | Emrich et al. | 37/142 R |
| 4,482,019 | 11/1984 | Murphy | 171/63 |

FOREIGN PATENT DOCUMENTS

| | | | |
|---|---|---|---|
| 41341 | 12/1981 | European Pat. Off. | 172/554 |
| 697458 | 9/1953 | United Kingdom | 172/552 |
| 457447 | 3/1975 | U.S.S.R. | 171/63 |
| 782731 | 11/1980 | U.S.S.R. | 172/33 |

Primary Examiner—James R. Feyrer
Attorney, Agent, or Firm—Frijouf, Rust & Pyle

[57] ABSTRACT

A mobile machine for uprooting vegetation from the ground and for separating soil attached to the uprooted vegetation is disclosed. The machine includes a frame and an uprooting mechanism for uprooting and removing vegetation from the ground, the uprooting mechanism being rotatably supported by the frame and driven by a source of power. A soil separating mechanism is driven by the source of power for separating the soil from the uprooted vegetation and for conveying the uprooted vegetation away from the ground at an acute angle relative the ground, the soil separating mechanism being rotatably supported by the frame. The soil separating mechanism includes a first and a second end, the first end being disposed adjacent the uprooting mechanism, the first end receiving thereon the uprooted vegetation and attached soil removed from the ground by the uprooting mechanism. A collecting container is disposed adjacent the second end of the soil separating mechanism for collecting the uprooted vegetation when the uprooted vegetation has been separated from the soil.

16 Claims, 10 Drawing Figures

MOBILE MACHINE FOR UPROOTING VEGETATION FROM THE GROUND

BACKGROUND OF THE INVENTION

1. Field of the Invention

This invention relates to a mobile machine for uprooting vegetation from the ground and for separating soil attached to the uprooted vegetation. More specifically, this invention relates to a tractor-drawn machine having its own source of power for uprooting palmetto plants and the like from the ground and for separating soil attached to the uprooted palmettos and for collecting the uprooted palmettos into a collecting container or the liike.

2. Information Disclosure Statement

Because of the ever-increasing costs of raw materials used in the building industry, many in the construction industry have sought ways of reducing the labor costs involved in the construction of domestic dwellings, new factory sites, warehouses, shopping centers and the like. A large percentage of the total construction costs involve the initial preparation of the building site in readiness for a subsequent building project. In many cases the building site is overgrown with palmetto plants or other vegetation having a root system that makes removal of the same from the ground not only a tedious operation but also a very costly one.

In the prior art, it has been customary, for example, in the preparation of an acre site to employ a bulldozer for clearing and levelling the proposed site. It is often the case that with the employment of a bulldozer the site may require 10 to 15 hours to clear. Furthermore, even when such land has been cleared with the use of such bulldozers the root systems of such palmetto plants and the like are still left embedded in the ground and may cause subsequent problems during the building operations.

The mobile machine of the present invention overcomes the costly employment of several bulldozers formerly used in the clearance of a site by providing a combined mechanism for uprooting the vegetation from the ground and for separating the uprooted vegetation from the soil still attached to the uprooted vegetation, and for collecting the uprooted vegetation in a container. Tests carried out with the machine of the present invention indicate than an acre site may easily be cleared using the machine of the present invention within one and one-half hours. Tests have also indicated that a similar acre site may require a bulldozer working for 10 to 15 hours to accomplish the same clearance. The costs involved in using a conventional bulldozer may average $100 per hour; therefore, the conventional cost of clearing an acre site may run as high as $1,500 or more. The same clearance project may be accomplished using a machine of the present invention within one and one-half hours, which clearly involves a considerable saving in the costs involved in preparing a building site.

Furthermore, the machine of the present invention has the added advantage of removing the vegetation and other debris from the building site, thereby avoiding any subsequent problems arising from the existence of the remains of root systems in the building site after the site has been cleared.

Although the prior art devices have resulted in a degree of site clearance, they have suffered from the problems of high cost and failure to remove completely the root systems from the ground. It is the primary object of the invention to provide a mobile machine for uprooting vegetation from the ground and for separating soil attached to the uprooted vegetation that overcomes the aforementioned inadequacies of the prior art devices and provides an improvement which significantly contributes to the reliability and the ease with which a building site can be cleared in preparation for building construction or the like.

Another object of the invention is the provision of a mobile machine for uprooting vegetation from the ground that reduces the cost of the preparation of a building site.

Another object of the present invention is the provision of a mobile machine for uprooting vegetation from the ground that substantially undermines the root systems of vegetation for a proposed building site and removes the same from the ground.

Another object of the invention is the provision of a mobile machine for uprooting vegetation from the ground that includes a mechanism for separating soil attached to the uprooted vegetation and for sifting such soil back onto the ground.

Another object of the invention is the provision of a mobile machine for uprooting vegetation from the ground that includes a container for collecting the uprooted vegetation and for discharging the same when such container is filled.

Another object of the present invention is the provision of a mobile machine for uprooting vegetation from the ground that includes a conveyor for conveying soil separated from the uprooted vegetation laterally relative the mobile machine for discharge at one side of the mobile machine.

Another object of the invention is the provision of a mobile machine for uprooting vegetation from the ground having a soil separating mechanism which includes a plurality of planar members which include a plurality of radial arms, the distal ends of which intermesh with the distal ends of adjacent planar members to cause a separation of soil attached to the uprooted vegetation from the uprooted vegetation.

Another object of the present invention is the provision of a mobile machine for uprooting vegetation from the ground in which the uprooting mechanism includes a plurality of tines, the leading edge of each tine defining a cavity for trapping soil therein for inhibiting the abrasive and corrosive effects of the soil on the tines.

Another object of the invention is the provision of a mobile machine for uprooting vegetation from the ground that includes a metallic plate of circular configuration disposed within the axle box of the uprooting mechanism for inhibiting filamentary material from winding around the axle of the uprooting mechanism and working through and damaging the axle box.

Another object of the present invention is the provision of a mobile machine for uprooting vegetation from the ground in which the radial arms of the soil separating mechanism are slightly inclined towards the direction of rotation of the radial arm for improving the soil separating characteristics of the soil separating mechanism.

Another object of the present invention of the provision of a mobile machine for uprooting vegetation from the ground in which the intermeshing adjacent radial arms overlap each other at the distal ends thereof, adjacent distal ends being spaced laterally relative each other within the range one-half to one and one-half inches, thereby improving the soil separating characteristics of the soil separating mechanism.

Another object of the present invention is the provision of a mobile machine for uprooting vegetation from the ground in which the soil separating mechanism is disposed along a plane which is disposed within the range of 25° to 35° relative the ground for enhancing the soil separating characteristics of the soil separating mechanism.

Anothr object of the present invention is the provision of a plurality of rods disposed around the periphery of each of the secondary axles for inhibiting the abrasive and corrosive wear caused by contact of the soil with the secondary axle, the rods providing a plurality of pockets for the retention of a protective layer of soil.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention within the scope of the disclosure. Particularly, with regard to the use of the invention disclosed herein, this should not be construed as being limited to mobile machines for uprooting palmettos from the ground, but should include mobile machine for uprooting and clearing any type of debris from the ground and for separating soil adhering to the vegetation or debris and for collecting such vegetation and debris for subsequent discharge. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The mobile uprooting machine of the present invention is defined by the appended claims with a specific embodiment shown in the attached drawings. For the purpose of summarizing the invention, the invention relates to a tractor-drawn mobile machine utilizing a pulling means such as a hitch, cable or the like for pulling the mobile machine and having a source of power for uprooting vegetation from the ground and for separating soil attached to the uprooted vegetation or the like. The invention also relates to a method of uprooting such vegetation from the ground and for separating the soil attached to the uprooted vegetation and for collecting the uprooted vegetation.

The mobile machine includes a frame and an uprooting mechanism for uprooting and removing vegetation from the ground, the uprooting mechanism being rotatably supported by the frame and driven by a source of power. The soil separating mechanism is driven by the source of power and separates the soil from the uprooted vegetation and conveys the uprooted vegetation away from the ground at an acute angle relative the ground, the soil separating mechanism being rotatably supported by the frame. The soil separating mechanism includes a first and a second end, the first end being disposed adjacent the uprooting mechanism, the first end of the soil separating mechanism receiving thereon the uprooted vegetation and attached soil removed from the ground by the uprooting mechanism. A collecting container is disposed adjacent the second end of the soil separating mechanism, the container collecting the uprooted vegetation when the uprooted vegetation has been separated from the soil.

In a more specific embodiment of the invention, the mobile machine includes mounting devices for mounting the source of power onto the frame. A first drive transmission connects the source of power to the uprooting mechanism such that the uprooting mechanism rotates relative the ground. A second drive transmission connects the source of power to the soil separating mechanism such that the soil separating mechanism rotates relative the ground. The uprooting mechanism further includes an axle which is rotatably supported by the frame, the axle having an axis of rotation disposed substantially parallel relative the ground. A plurality of disks are rigidly connected relative to the axle such that each of the disks is disposed in spaced parallel relationship relative each other and substantially normal to the axis of rotation of the axle.

A plurality of ground engaging tines are disposed substantially tangentially relative the axis of rotation of the axle. A set of the ground engaging tines of the plurality of.tines are disposed between adjacent disks of the plurality of disks, each of the tines of the set of tines radiating outwardly from between the adjacent disks away from the axis of rotation of the axle. The uprooting mechanism further includes a first and a second side of each of the plurality of disks. A bridging member of a plurality of bridging members extends between the peripheries of adjacent disks, the bridging member extending respectively between the first and the second sides of adjacent disks. A first tine of the set of tines is rigidly connected to the first side of a disk. A second tine of the set of tines is rigidly connected to the bridging member, which extends between the first and the second side respectively of the adjacent disks, and a third tine of the set of tines is rigidly connected to the second side of the adjacent disk such that the first, second and third tines are disposed between the first and the second sides of adjacent disks and radiate in a spoke-shaped configuration relative the axis of rotation of the axle.

The uprooting mechanism further includes tines, each of which engage the ground at substantially the same angle. Cavities defined by the leading ground engaging edge of distal end of each of the tines trap soil within each of the cavities for inhibiting the abrasive and corrosive effect of the soil on the tines.

The soil separating mechanism includes a plurality of secondary axles, each of the secondary axles being rotatably supported by and extending between the frame, the plurality of secondary axles being disposed in a plane, which is disposed at an acute angle relative the ground. A plurality of planar members of generally circular configuration are disposed on each of the secondary axles, the planar members being rigidly connected to the secondary axles in spaced parallel configuration relative each other and substantially normal to the axis of rotation of the secondary axle. Each of the planar members are concentric relative the axis of rotation of the secondary axle on which the planar member is disposed and each of the secondary axles is connected to a substantially equal number of planar members.

The soil separating mechanism further includes a first secondary axle of the plurality of secondary axles, the first secondary axle being disposed adjacent the uprooting mechanism for receiving vegetation and soil attached to the vegetation from the uprooting mechanism. A second secondary axle of the plurality of secondary axles is disposed adjacent the collecting means for discharging uprooted vegetation into the collecting container after the separating of the soil from the vegetation. The secondary axles are driven at a faster rate of rotation relative the rate of rotation of the uprooting means, the relative rate of rotation being substantially within the ratio of four to three. Each of the planar members further includes a plurality of substantially radial arms, each of the radial arms being of the same thickness along the length thereof, and each of the radial arms having a width which tapers towards the distal end of the radial arm. Each of the radial arms is slightly inclined towards the direction of rotation of the radial arm about the axis of rotation of the secondary axle from which the inclined radial arm extends.

In a preferred embodiment of the present invention, each of the planar members includes four radial arms. Also in a preferred embodiment of the present invention, each of the plurality of secondary axles further includes a plurality of rods rigidly connected to the periphery of the secondary axle, the plurality of rods being disposed around and in spaced parallel relationship relative the axis of rotation of the secondary axle for collecting soil between adjacent rods for inhibiting abrasive and corrosive wear to the secondary axle. The planar members disposed on one of the secondary axles intermesh with the planar members of an adjacent secondary axle such that the distal end of each of the radial arms is disposed nearer to the axis of rotation of the adjacent secondary axle than the distance between the distal end and the axis of rotation of the secondary axle from which the radial arm extends when adjacent arms intermesh.

In a preferred embodiment of the present invention, the intermeshing adjacent arms overlap each other at the distal ends thereof, and the distal ends of the intermeshing adjacent arms are spaced laterally relative each other with the distance of overlap and the lateral distance between adjacent distal ends being within the range one-half to one and one-half inches. The plurality of secondary axles rotate in the same direction of rotation relative each other and in the same direction of rotation relative the uprooting means.

The mobile machine further includes a hydraulic motor of the first drive transmission driven by the source of power, the hydraulic motor being connected to the uprooting means to rotate the uprooting means about an axis of rotation substantially parallel relative the ground. A plurality of secondary hydraulic motors of the second drive transmission are each driven by the source of power. Each of the secondary motors is connected to one of a plurality of the secondary axles of the soil separating mechanism. A control device controls the relative speed of rotation of each of the secondary axles and also controls the speed of rotation of the uprooting means.

The mobile machine further includes rearward wheels for rotatably supporting the mobile machine and a conveyor driven by the source of power. The conveyor is disposed beneath the soil separating mechanism and adjacent the container for moving the soil separating from the uprooted vegetation laterally relative the soil separating mechanism. The conveyor transports the separated soil to one side of the mobile machine in order to inhibit the sprinkling of soil onto the rearward wheels and for permitting the separated soil to be sprinkled to one side of the mobile machine in advance of the reverse passage of the mobile machine relative the ground.

The collecting container further includes an open top container which is disposed beneath the second end of the soil separating mechanism. A sloping baffle is disposed within the container for guiding the uprooted vegetation discharged into the container away from one side of the container. A hinge connects the container with the frame for permitting hinging of the container relative the frame such that when the container is pivoted relative the frame the uprooted vegetation pours from the container. A hydraulic cylinder extends between the container and the frame for controllably pivoting the container relative the frame for unloading the uprooted vegetation from the container.

The mobile machine also includes a forward and a rearward end of the frame. A goose-necked portion is pivotably connected about a vertical axis relative to the forward end of the frame. Forward wheels are rotatably connected to the goose-necked portion for steerably supporting the forward end of the frame and rearward wheels are rotatably connected to the rearward end of the frame for supporting the frame. A pair of radius arms are pivotably connected to the forward end of the frame for pivotal movement about a common horizontal axis. The distal ends of the radius arms are pivotably connected about a common horizontal axis to the rearward end of the frame. A frame-tilting hydraulic cylinder extends between the forward end of the rearward end of the frame and the rearward end of the frame for controllably tilting the frame relative the ground.

The method of uprooting vegetation from the ground includes pulling the mobile machine over the ground, controlling the frame-tilting hydraulic cylinders such that the uprooting tines are positioned with the tines digging into the ground a sufficient distance to undermine the root systems of vegetation to be uprooted. The speed of rotation of the uprooting tines is controlled such that as the mobile machine is pulled along the ground, vegetation is uprooted from the ground. The speed of rotation of each of the secondary axles is controlled such that as the uprooted vegetation is fed upwardly and away from the ground along a plurality of soil separating radial arms, soil attached to the uprooted vegetation is separated from the uprooted vegetation and is permitted to sift through the intermeshing radial arms onto the ground. Part of the sifted soil is moved laterally relative the mobile machine in order to discharge part of the soil to one side of the machine and to inhibit the sifting of soil onto the rearward wheels of the mobile machine. The uprooted vegetation is collected from the soil separating radial arms into the container, and the hydraulic cylinder is controlled in order to periodically discharge the uprooted vegetation from the container when the container is full.

The foregoing has outlined rather broadly the more pertinent and important features of the present invention in order that the detailed description that follows may be better understood so that the present contribution to the art can be more fully appreciated. Additionally, features of the invention will be described hereinafter which form the subject of the claims of the invention. It should be appreciated by those skilled in the art that the conception and the specific embodiment disclosed may be readily utilized as a basis for modifying or designing other devices for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts through the several views of the drawings.

DETAILED DESCRIPTION

Figure 1:
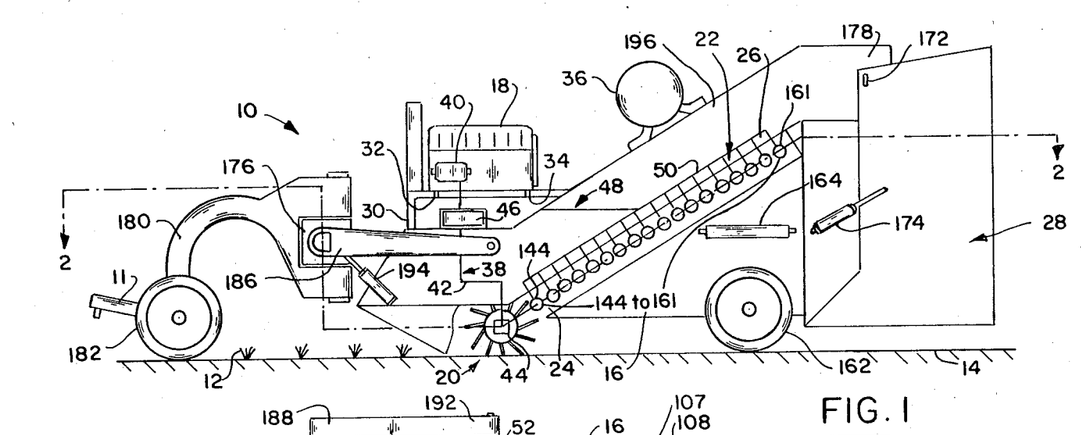
FIG. 1 is a side elevational view of the mobile machine for uprooting vegetation from the ground according to the present invention.

FIG. 1 is a front elevational view of a mobile machine generally designated 10 for uprooting vegetation 12 from the ground 14. The mobile machine 10 includes a frame 16, hitch 11, having a source of power 18 mounted thereon. An uprooting mechanism generally designated 20 is rotatably supported by the frame 16 and is driven by the source of power 18. A soil separating mechanism generally designated 22 includes a first end 24 which is disposed adjacent the uprooting mechanism 20 such that vegetation 12 uprooted by the uprooting mechanism 20 is received on the first end 24 of the soil separating mechanism 22. The soil separating means is disposed at an acute angle relative the ground such that the uprooted vegetation is moved upwardly away from the uprooting mechanism 20 towards a second end 26 of the soil separating mechanism 22. During the passage of the uprooted vegetation upwardly along the soil separating mechanism 22, soil attached to the uprooted vegetation is separated from the uprooted vegetation and the uprooted vegetation is discharged from the second end 26 of the soil separating mechanism 22 into a collecting container generally designated 28.

The source of power 18 is preferably an internal combustion engine which is mounted on an extension frame 30 extending from the frame 16, the source of power 18 being mounted on the extension frame 30 by means of mounting anchors 32 and 34 respectively. A fuel tank 36 is shown representatively in FIG. 1 and is connected to the source of power 18. A first drive transmission generally designated 38 includes a hydraulic pump mechanism 40, a hydraulic supply line 42 extending from the hydraulic pump 40 to a hydraulic motor 44, connected to the uprooting mechanism 20. A control box 46 is disposed between the hydraulic pump 40 and the hydraulic motor 44 for controlling the speed of rotation of the uprooting mechanism 20.

A second drive transmission generally designated 48 includes the hydraulic pump 40, the control box 46, and a plurality of hydraulic supply lines 50, each of which is connected to a secondary hydraulic motor of a plurality of secondary hydraulic motors to be described hereinafter such that the speed of rotation of the soil separating mechanism 22 may be individually controlled.

Figure 2:
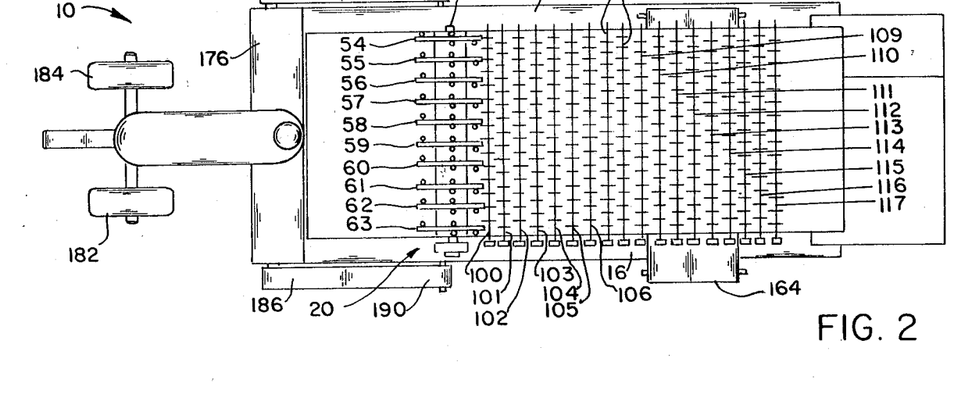
FIG. 2 is a sectional view taken on the line 2—2 of FIG. 1.

FIG. 2 is a sectional view of the mobile machine 10 taken on the line 2—2 of FIG. 1. FIG. 2 shows the uprooting mechanism 29 rotatably supported and extending between the frame 16. The uprooting mechanism 20 includes an axle 52 rotatably supported by the frame 16, the axis of rotation of the axle 52 being disposed substantially parallel relative the ground 14. A plurality of disks 54 to 63 are rigidly connected to the axle 52 such that the disks 54 to 63 are disposed in spaced parallel relationship relative each other and substantially normal relative the axis of rotation of the axle 52.

Figure 3:
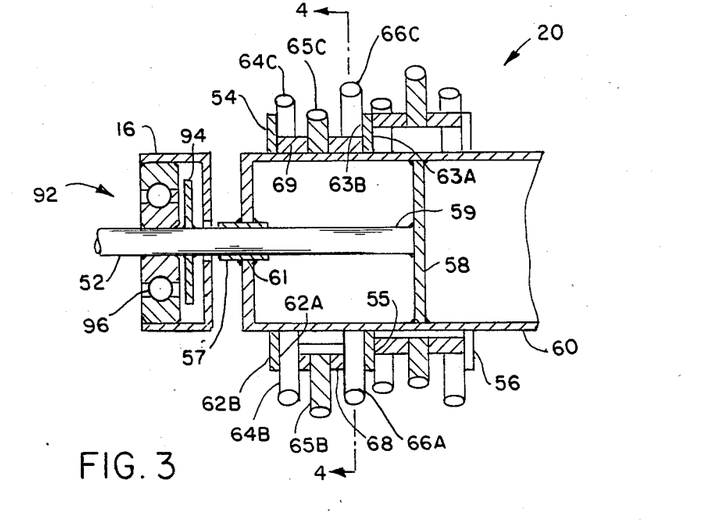
FIG. 3 is a sectional view of a portion of the uprooting mechanism of the mobile machine shown in FIG. 1.

FIG. 3 is a sectional view of a portion of the uprooting mechanism 20. FIG. 3 shows the axle 52 and disks 54 to 56. The uprooting mechanism 20 includes the axle 52 and a sleeve 57 which is heated and slipped over the axle 52. The sleeve 57 having cooled provides a shrink fit over the axle 52 as shown in FIG. 3. A circular centralizing plate 58 is welded to the proximal end 59 of the axle 52. A drum 60 defining a central aperture 61 is slipped over the distal end (not shown) of the axle 52 until the sleeve 57 is engaged within the aperture 61. The drum 60 is then welded to the sleeve 57 and the plate 58 is externally welded to the drum 60.

Each of the disks 54–56 defines a circular opening which is of the same diameter as the internal diameter of the drum 60. The disks 54–56 are slipped over the drum 60 and are welded thereto such that each of the disks is spaced relative an adjacent disc with each disk disposed normal to the axis of rotation of the axle 52.

A plurality of tines extend in spoke-shaped configuration from between each pair of adjacent disks. In the preferred embodiment of the present invention a set of nine tines extends from between each pair of adjacent disks. With reference to the pair of adjacent disks 54 and 55, the disk 54 includes a first and a second side 62A and 62B respectively. The disk 55 also includes a first and a second side 63A and 63B respectively.

Figure 4:
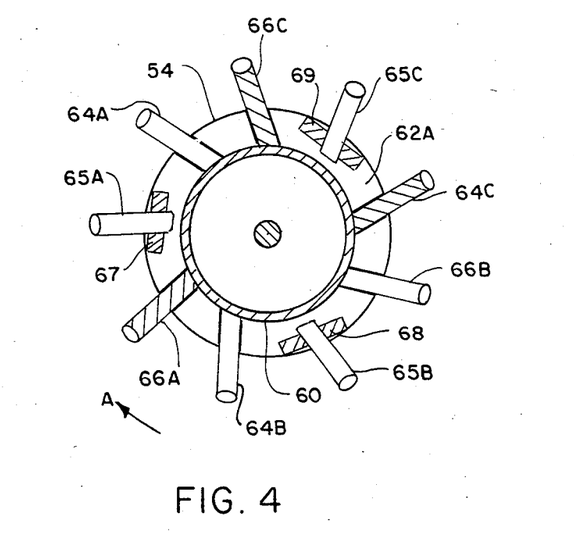
FIG. 4 is a sectional view of the uprooting mechanism showing the plurality of tines secured to the plurality of disks.

FIG. 4 is a sectional view of the uprooting mechanism taken on the line 4—4 of FIG. 3. FIG. 4 shows a first ground engaging tine 64A of the set of nine tines disposed between the first side 62A of the disk 54 and the second side 63B of the disk 55. The first tine 64A is welded to the first side 62A of the disk 54 and extends outwardly relative the axis of rotation of the axle 52 and is disposed tangentially relative the axle 52. A second tine 65A extends through a first bridging member 67. The first bridging member 67 extends between the sides 62A and 63B respectively. A third tine 66A is welded to the second side 63B of the disk 55 and is disposed tangentially relative the axle 52. A fourth tine 64B is welded to the side 62A; a fifth tine 65B is welded to and extends from a second bridging member 68, and a sixth tine is welded to the second side 63B of the disk 55. A seventh, eighth and ninth tine 64C, 65C and 66C respectively, are welded to the side 62A; a third bridging member 69 and the side 63B respectively, such that the tines 64A, 65A, 66A, 64B, 65B, 66B, 64C, 65C and 66C are equally spaced relative each circumferentially around the drum 60. When the axle 52 is rotated, each of the nine tines of each set of tines progressively engages the soil across the width between adjacent disks. The arrangement is such that the ground is dug in a side-to-side manner three times for every one revolution of the uprooting mechanism 20, the uprooting mechanism rotating in the direction of the arrow A.

Figures 4A, 5A, 8:
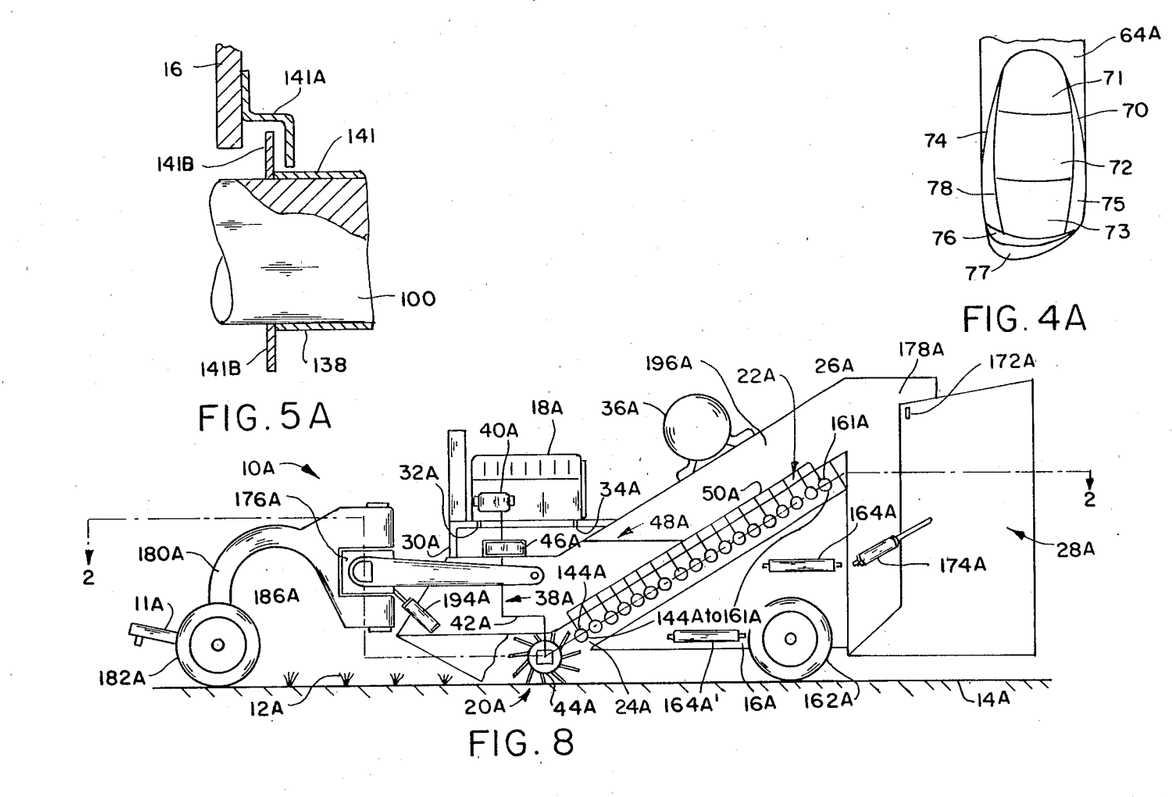
FIG. 4A is an enlarged elevational view of the distal end of one of the tines showing the plurality of cavities.
FIG. 5A is a sectional view taken on the line 5A—5A of FIG. 5.
FIG. 8 is an alternative embodiment of the mobie machine of the present invention showing a plurality of conveyors.

As shown in FIG. 4A, which is an enlarged view of the distal 70 of one of the tines 64A, the distal end defines a plurality of cavities 71–77. The cavities 71–77 are formed by depositing a ridge 78 of metallic weld to the distal end 70 of the tine 64A. The cavities 71–77 in use of the machine become filled with soil, and the layer of soil within the cavities 71–77 inhibits corrosive and abrasive wear to the distal end 70 of the tine 64A. Each of the tines of the uprooting mechanism is provided with such cavities, and the distal ends of the tines are of a blunt configuration such that cutting of vegetation of avoided.

As shown in FIG. 3, an axle box generally designated 92 includes a metallic plate 94 of circular configuration and rigidly attached to the axle 52. The metallic plate 94 inhibits filamentary material from winding around the shaft 52 and working its way through the axle box 92 to foul the bearing mechanism 96 and seal (not shown).

The soil separating mechanism 22 includes a plurality of secondary axles 100 to 117, as shown in FIG. 2. Each of the secondary axles 100 to 117 is rotatably supported by and extends between the frame 16 such that the plurality of secondary axles 100 to 117 are disposed in a plane which is disposed at an acute angle of 30° relative the ground 14. As shown more particularly with reference to FIG. 5, which shows a portion of the soil separating mechanism 22, each of the secondary axles 100 and 101 include a plurality of planar members 118 to 121 and 122 to 126 respectively. Each of the planar members 118 to 121 and 122 to 126 respectively are of generally circular configuration and are disposed in spaced parallel relationship relative each other and substantially normal to the axis of rotation of the secondary axles 100 and 101 respectively. Each of the secondary axles 100 to 117 has substantially an equal number of planar members connected thereto. A first of the secondary axles 100 of the plurality of secondary axles 110 to 117 is disposed adjacent the uprooting mechanism 20 for receiving vegetation and soil attached to the vegetation from the uprooting mechanism 20. A second secondary axle 117 of the plurality of secondary axles 100 to 117 is disposed adjacent the collecting container 28 for collecting uprooted vegetation discharged from the soil separating mechanism 22.

By means of the control box 46 as shown in FIG. 1, the plurality of secondary axles 100 to 117 are driven by the plurality of secondary hydraulic motors at a faster rate of rotation relative the rate of rotation of the uprooting mechanism 20, the ratio of the rate of rotation of the secondary axles relative the rate of rotation of the uprooting mechanism 20 being substantially in the order of four to the ratio three.

Figures 5, 6:
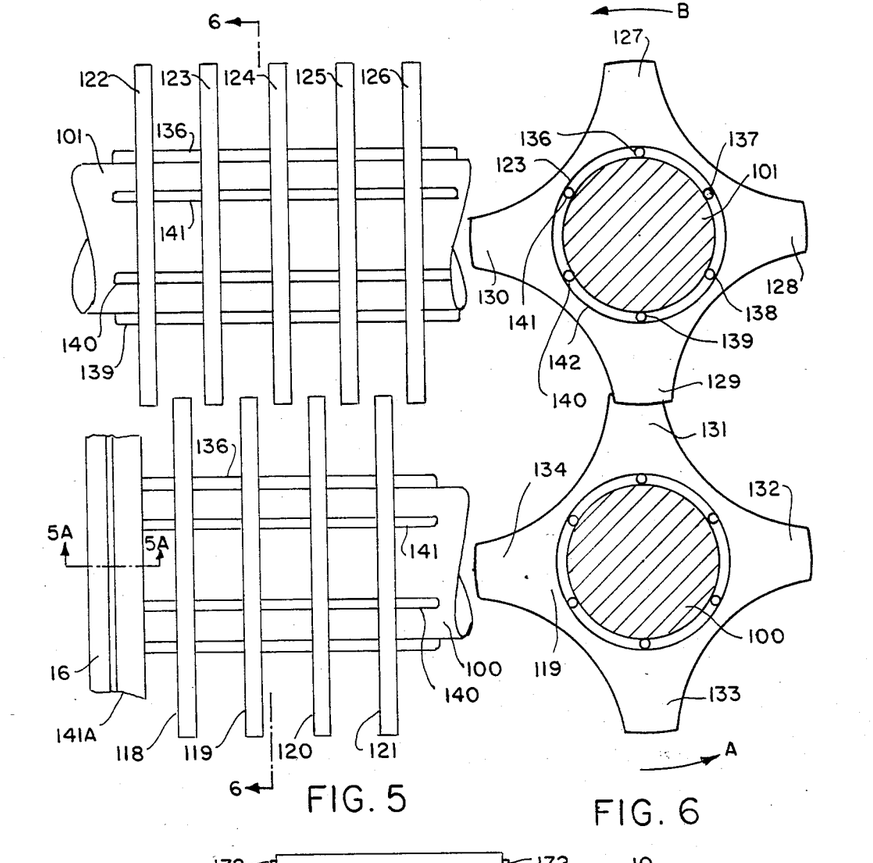
FIG. 5 is a plan view of a portion of the soil separating mechanism of the mobile machine shown in FIG. 1, and showing the intermeshing relationship of the radial arms.
FIG. 6 is a sectional view taken on the line 6—6 of FIG. 5.

As shown particularly with reference to FIG. 6, which is a sectional view taken on the line 6—6 of FIG. 5, each of the planar members 118 to 126 includes a plurality of substantially radial arms. The planar member 123 includes radial arms 127 to 130. The planar member 119 includes radial arms 131 to 134. As shown in FIG. 5, each of the radial arms has the same thickness along the length thereof; however, each of the radial arms 127 to 134 has a width which tapers towards the distal end of each arm as shown in FIG. 6. The secondary axles 100 and 101 rotate respectively in the directions as indicated by the arrows A and B respectively, and the arms 131 to 134 are slightly inclined towards the direction of rotation as indicated by the arrow A, and the radial 127 to 130 are inclined slightly towards the direction of rotation of the axle 101 as indicated by the arrow B.

As shown in FIGS. 5 and 6, a plurality of rods 136 to 141 are rigidly connected to the periphery of the secondary axle 101, the rods 136 to 141 being disposed around and in spaced parallel relationship relative the axis of rotation of the secondary axle 101. The rods 136 to 141 are welded or otherwise attached to the periphery of the secondary axle 101 prior to securing the planar members 122 to 126 onto the secondary axle 101. The planar member 123 includes a central aperture 142 of a dimension such that the planar member 123 may be slipped over the plurality of rods 136 to 141 and welded or otherwise secured at the desired disposition relative the secondary axle 101. The purpose of the plurality of rods 136 to 141 is to collect soil between adjacent rods during operation of the mobile machine such that soil collected between adjacent rods inhibits the abrasive and corrosive wear to the secondary axle 101 during operation of the machinery. Each of the secondary axles 100 to 117 includes such plurality of rods for inhibiting corrosion to the secondary axles.

FIG. 5A is a sectional view of one end of the secondary axle 100 taken on the line 5A—5A of FIG. 5. The plurality of rods 136–141 terminate in the same plane and are disposed adjacent a hood member 141A extending from the frame 16. The hood member 141A is of curved, Z-shaped configuration to conform with and to cooperate with a protector plate 141B welded to the ends of the rods 136–141. The hood member 141A and plate 141B cooperate to prevent debris and soil from fouling the various sealing and bearing mechanisms of the secondary axles 100–117.

As shown particularly with reference to FIGS. 5 and 6, the planar members 119 and 123 are disposed respectively on the secondary axles 100 and 101 such that during rotation of the secondary axles 100 and 101 the distal ends of the radial arms of the respective members 119 and 123 will intermesh. As shown in FIG. 6, the distal ends of the radial arms 131 overlaps the distal end of the arm 129 by a distance substantially equal to the lateral distance between the distal end of the radial arms 129 and 131 respectively, as shown in FIG. 5. During various trials of the present mobile machine, the optimum distance between the distal ends of the radial arms and the distance of overlap of the radial arms has been found to be within the range one-half to one and one-half inches, preferably one inch.

As shown in FIG. 5, the distance between the distal ends respectively of the radial arms 118 and 122 is less than the distance between the adjacent distal ends of the radial arms 118 and 123. In operation of the machine it has been found that by pairing together the radial arms as 118 and 122, 119 and 123, 120 and 124, 121 and 125 when a twig or the like is located between the rotating secondary axles 100 and 101, the twig will be thrown upwardly along the inclined soil-separating mechanism 22. If each of the radial arms 118–121 respectively are disposed equidistant between the respective adjacent radial arms 122 and 123, 123 and 124, 124 and 125, 125 and 126, it has been found that there is a tendency for such twigs to be snapped and thrown downwardly through the soil separating mechanism. When these twigs are thus broken, the soil separating efficiency of the mechanism is thereby impaired.

As shown in FIG. 6, the secondary axles 100 and 101, together with the other secondary axles 102 to 117 all rotate in the same direction of rotation, and this direction of rotation is in the opposite direction to the direction of rotation of the uprooting mechanism 20.

As described hereinbefore with reference to FIG. 1, the hydraulic pump 40 is connected by means of control box 46 and a plurality of hydraulic lines 50 to a plurality of secondary hydraulic motors 144 to 161. Each of the hydraulic motors 144 to 161 is able to be independently controlled by means of the control box 46 so that the speed of rotation of each of the secondary axles 100 to 117 may be varied independently of each other. However, in normal operation of the mobile machine the various secondary hydraulic motors 144 to 161 are controlled to rotate at approximately the same speed of rotation relative each other and at a speed faster than the rate of rotation of the uprooting mechanism 20.

Figure 7:
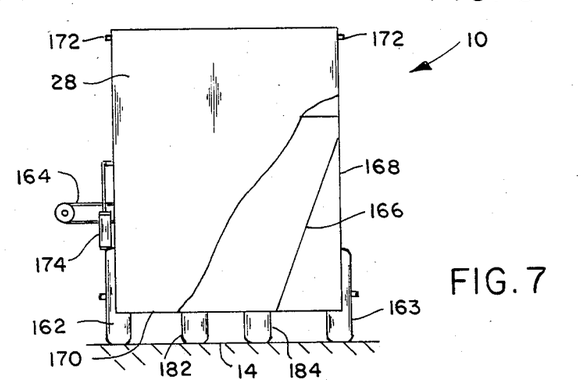
FIG. 7 is a side elevational view of the mobile machine shown in FIG. 1, showing the disposition of the container.

The mobile machine further includes rearward wheels 162 and 163, as shown in FIG. 7. The rearward wheels 162 and 163 are rotatably supported and extend from the frame 16 for rotatably supporting the mobile machine 10. A conveyor 164 as shown in FIG. 7 is driven by the source of power 18 and is disposed beneath the soil separating mechanism 22 and adjacent to the collecting container 28. The conveyor 164 moves the soil separated from the uprooted vegetation laterally relative the soil separating mechanism 22. The conveyor 164 transports the separated soil to one side of the mobile machine 10, as shown in FIG. 7, such that sprinkling of soil onto the rearward wheels 162 and 163 is inhibited. Furthermore, separated soil is sprinkled onto the ground to one side of the machine 10 in advance of the reverse passage of the mobile machine 10 relative the ground 14. The soil separating mechanism 22 is inclined at an angle relative the ground within the range of 25° to 35°, but preferably at 30° relative the ground.

In an alternative embodiment of the present invention as shown in FIG. 8, a plurality of transverse conveyors 164A, 164A$^i$ and 164A$^{ii}$ (not shown) are disposed beneath the soil-separating mechanism 22. The provision of a plurality of conveyors 164A, 164A$^i$ and 164A$^{ii}$ has been found to be particularly advantageous when the mobile machine is used in road making operations because all the sifted soil separated from the uprooted vegetation is conveyed to one side of the mobile machine and is deposited there as the machine progresses along a construction site. The remainder of the mobile machine shown in FIG. 8 is identical to that shown in FIG. 1; however, similar parts are referred to with the suffix "A".

As shown with particular reference to FIGS. 1 and 8, the collecting means includes a container 28 having an open top disposed beneath and to the rear of the second end 26 of the soil separating mechanism 22. A sloping baffle 166 shown particularly with reference to FIG. 7 extends from one side 168 of the container 28 towards the floor 170 of the container 28 for guiding the uprooted vegetation discharged into the container 28 away from the side 168 of the container 28. A hinge 172 shown in FIG. 1 connects the container 28 with the frame 16 and permits hinging of the container 28 relative the frame 16 such that when the container is pivoted relative the frame 16 the uprooted vegetation pours from the container 28. A hydraulic ram 174 is pivotally connected to the frame 16 and to the container 28 such that operation of the hydraulic ram 174 is controlled from the control box 46 to periodically discharge uprooted vegetation from the container 28.

As shown particularly in FIGS. 1 and 2, the mobile machine 10 includes a frame 16 having a forward end 176 and a rearward end 178. A goose-necked portion 180 is pivotally connected about a vertical axis relative the forward end 176 of the frame 16. Forward wheels 182 and 184 are rotatably connected to the goose-necked portion 180 for steerably supporting the forward end 176 of the frame 16. The rearward wheels 162 and 163 are rotatably connected to the rearward end 178 of the frame 16. A pair of radius arms 186 and 188 shown particularly in FIG. 2 are pivotally connected about a horizontal axis to the forward end 176 of the frame 16. The distal ends 190 and 192 of the radius arms 186 and 188 respectively are pivotally connected about a common horizontal axis to the rearward end 178 of the frame 16. Frame fitting hydraulic rams 194, one of which is shown in FIG. 1, extend between the forward end 176 of the frame 16 and the rearward end 178 of the frame 16 for controllably tilting the rearward end 178 of the frame 16 relative the ground. The rearward end 178 of the frame 16 includes a tunnel-shaped cowling 196 which extends over the length of the uprooting mechanism 20 and the soil separating mechanism 22 in order to guide uprooted vegetation upwardly along the soil separating mechanism 22 and into the container 28.

In operation of the mobile machine of the present invention, the mobile machine is pulled over the ground 14 by means of a tractor (not shown). The hydraulic motor 44 is caused to rotate by an appropriate control of the control box 46, and the frame tilting hydraulic ram 194 is controlled to tilt the rearward end 178 of the frame 16, to the desired disposition of the vegetation uprooting mechanism 20 relative the ground 14. If vegetation having a deeply-embedded root system is to be removed from the ground, the frame tilting hydraulic ram 194 is operated such that the uprooting mechanism 20 engages deeply into the soil to undermine the deep root systems. As the tines of the uprooting mechanism 20 dig into the ground 14, vegetation 12 will be uprooted from the ground 14 during the forward passage of the mobile machine 10. As the various tines engage the soil, the soil is collected within the cavities 71-77 at the distal ends of the various tines, and this layer of soil helps to protect the distal ends of the tines from the considerable abrasive action that these tines undergo during operation of the machine.

Uprooted vegetation is thrown by the rotating uprooting mechanism 20 onto the top of the first end 24 of the soil separating mechanism 22. The speed of rotation of the various secondary axles of the soil separating mechanism 22 are controlled by means of the control box 46 such that the secondary axles rotate at a speed which is higher relative the speed of rotation of the uprooting mechanism 20. As the intermeshing radial arms of the soil separating mechanism intermesh, uprooted vegetation is progressively thrown upwardly at an acute angle relative the ground along the soil separating mechanism 22. As the uprooted vegetation is moved upwardly along the soil separating mechanism, soil attached to the uprooted vegetation is shaken from the uprooted vegetation by the intermeshing radial arms, and the loosened soil is able to sift downwardly through the intermeshing radial arms back down to the ground beneath. The uprooted vegetation, which is too large to sift through and between the intermeshing radial arms, is progressively carried upwardly along the soil sifting mechanism until it is discharged from the second end 26 of the soil separating mechanism into the collecting container 28.

The various secondary axles 100–117 can be independently rotated at various speeds of rotation to accommodate soil of various degrees of moisture. Usually when operating in a very moist soil it has been found preferable to rotate the secondary axles at a relatively slow rate of rotation, whereas dry soil which is easily separated may be rapidly separated and the vegetation rapidly moved upwards along the top of the soil separating means.

The conveyor 164 is operated to move soil sifting downwardly through the soil separating mechanism 22 such that the sifted soil that would normally fall onto the rearward wheels 162 and 163 is moved laterally to one side of the mobile machine 10 and is discharged to one side of the mobile machine in advance of the reverse passage of the machine over the ground. When the container 28 has become filled with uprooted vegetation, the hydraulic ram 174 is actuated to pivot the container 28 about the hinge 172 to empty the contents of the container 28 onto the ground. The uprooted vegetation pours from the container 28 and is guided to one side of the container 28 by means of the baffle 166. The metallic plate 94 of the uprooting mechanism 20 is located between the disk 54 and the bearing 96 such that a piece of wire or the like which has become wrapped around the axle 52 is prevented by the circular plate 94 from entering into the bearing 96 and and adjacent seal (not shown).

The mobile machine of the present invention operates in an extremely efficient manner to rapidly remove deeply-rooted vegetation, such as palmetto plants, from the ground and includes means for efficiently removing the soil attached to such uprooted vegetation and means for collecting the uprooted vegetation for periodic discharge of the same. Not only does the machine of the present invention greatly reduce the cost involved in the preparation of a site for subsequent building operations, but it also provides a machine that removes the potential hazard caused by the leaving of root systems in the prepared site, as has been the case in the prior art building site preparation operations.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A tractor-drawn mobile machine having a source of power for uprooting vegetation from the ground and for separating soil attached to the uprooted vegetation, said machine comprising in combination:

a frame;
a forward and a rearward end of said frame;
a goose-necked portion pivotably connected about a vertical axis relative said forward end of said frame;
forward wheel means rotatably connected to said goose-necked portion for steerably supporting said forward end of said frame;
rearward wheel means rotatably connected to said rearward end of said frame for supporting said frame;
a pair of radius arms, each of said radius arms being pivotably connected to said forward end of said frame for pivotal movement about a common horizontal axis, the distal ends of said radius arms being pivotably connected about a common horizontal axis to said rearward end of said frame;
frame-tilting hydraulic means extending between said forward end of said frame and said rearward end of said frame for controllably tilting said frame relative the ground;
an uprooting means for uprooting and removing vegetation from the ground, said uprooting means being rotatably supported by said frame and driven by the source of power;
said uprooting means includes an axle rotatably supported by the frame, said axle having an axis of rotation disposed parallel relative the ground and further includes a plurality of ground engaging tines disposes substantially tangentially relative said axis of rotation of said axle;
said tines include a cavity means defined by the leading ground engaging edge of the distal end of each of said tines for trapping soil within said cavity means for inhibiting abrasive and corrosive effects of the soil on the tines;
said distal end of said tines being of a blunt configuration to inhibit the cutting of vegetation;
soil separating means driven by the source of power for separating the soil from the uprooted vegetation and for conveying the uprooted vegetation away from the ground at an acute angle relative the ground, said soil separating means being rotatably supported by said frame, said soil separating means including a plurality of intermeshing radial arms extending radially from the axis of rotation of a plurality of parallel-spaced planar members disposed normal to the axis of rotation of said soil separating means, such that each of the distal ends of said radial arms intermesh with an adjacent distal end of a radial arm extending from a planar member rigidly supported by an adjacent axle of said soil separating means, for separating soil from and for conveying said uprooted vegetation away from the ground;
a first and a second end of said soil separating means, said first end being disposed adjacent said uprooting means, said first end receiving thereon the uprooted vegetation and attached soil removed from the ground by said uprooting means; and
a collecting means disposed adjacent said second end of said soil separating means for collecting the uprooted vegetation when the uprooted vegetation has been separated from the soil.

2. A mobile machine as set forth in claim 1, wherein said first and said second ends of said soil separating means are disposed along a plane which is disposed within the range of 25° to 35° relative the ground.

3. A tractor drawn mobile machine having a source of power for uprooting vegetation from the ground and separating soil attached to the uprooted vegetation, said machine comprising in combination:

a frame;

a forward and a rearward end of said frame;

a goose-necked portion pivotably connected about a vertical axis relative said forward end of said frame;

forward wheel means rotatably connected to said goose-necked portion for steerably supporting said forward end of said frame;

rearward wheel means rotatably connected to said rearward end of said frame for supporting said frame;

an uprooting means for uprooting and removing vegetation from the ground, said uprooting means being rotatably supported by said frame and driven by the source of power;

said uprooting means includes an axle rotatably supported by said frame, said axle having an axis of rotation disposed substantially parallel relative the ground;

said uprooting means includes a plurality of ground engaging tines disposed substantially tangentially relative said axis of rotation of said axle and further includes a cavity means defined by the leading ground engaging edge of the distal end of each of said tines for trapping soil within said cavity means for inhibiting abrasive and corrosive effects of the soil on the tines;

soil separating means driven by a source of power for separating the soil from the uprooted vegetation and for conveying the uprooted vegetation away from the ground at an acute angle relative the ground, said soil separating means being rotatably supported by said frame and including a plurality of secondary axles, each of said secondary axles being rotatably supported by and extending between said frame, said plurality of secondary axles being disposed in a plane, said plane being disposed at an acute angle relative the ground;

a plurality of planar members disposed on each of said secondary axles with said planar members being rigidly connected to said secondary axles in spaced relationship relative each other and substantially normal to the axis of rotation of said secondary axle, said planar members being concentric relative the axis of rotation of said secondary axles on which said planar member is disposed such that each of said secondary axles is connected to substantially equal number of planar members;

said planar member further includes a plurality of substantially radial arms, each of said arms being of the same thickness along the length thereof, each of said arms having width which tapers toward the distal end of said radial arm;

said planar members disposed on one side of said secondary axles intermesh with said planar members on an adjacent secondary axle such that the distal end of each of said radial arms is disposed near to the axis of rotation of said adjacent secondary axle than the distance between said distal and said axis of rotation of said secondary axle from which said arm extends when adjacent arms intermesh;

said intermeshing adjacent arms overlap each other at the distal ends thereof and are spaced laterally relative each other;

a first and a second end of said soil separating means, said first end being disposed adjacent said uprooting means, said first end receiving thereon the uprooted vegetation and attached soil removed from the ground by set up rooting means; and a collecting means disposed adjacent to said second end of said soil separating means for collecting the uprooting vegetation when the uprooted vegetation has been separated from the soil.

4. A mobile machine as set forth in claim 3, further including:

means for mounting the source of power on the frame;

first drive means for connecting the source of power to said uprooting means such that said uprooting means rotates relative the ground; and second drive means for connecting the source of power to said soil separating means such that said soil separating means rotates relative the ground.

5. A mobile machine as set forth in claim 4, further including:

a hydraulic motor of said first drive means driven by said source of power, said hydraulic motor being connected to said uprooting means to rotate said uprooting means about an axis of rotation substantially parallel relative the ground;

a plurality of secondary hydraulic motors of said second drive means, each driven by said source of power, each of said secondary motors being connected to one of a plurality of secondary axles of said soil separating means; and control means for controlling the relative speed of rotation of each of said secondary axles and for controlling the speed of rotation of said uprooting means.

6. A mobile machine as set forth in claim 4, wherein said uprooting means further includes:

an axle rotatably supported by said frame, said axle having an axle of rotation disposed substantially parallel relative the ground;

axle box means disposed adjacent both ends of said axle for inhibiting filamentary material from winding around said axle and working through said axle box, said axle box means including a metallic plate of circular configuration;

a plurality of disks rigidly connected to said axle, each of said disks being disposed in space parallel relationship relative each other and substantially normal to the axis of rotation of said axle; and a set of said ground-engaging tines of said plurality of tines being disposed between adjacent disks of said plurality of disks, each of said tines of said set of tines radiating outwardly from between said adjacent disks away from said axis of rotation of said axle.

7. A mobile machine as set forth in claim 6, wherein said uprooting means further includes:

a first and a second side of each of said plurality of disks;

a plurality of briding members extending between the peripheries of adjacent disks, said bridging members extending respectively between said first and said second sides of adjacent disks;

a first tine of said set of tines being rigidly connected to said first side of a disk;

a second tine of said set of tines being rigidly connected to said bridging member which extends between said first and said second side respectively of said adjacent disks;

a third tine of said set of tines being rigidly connected to said second side of said adjacent disk, such that said first, second and third tines are disposed between said first and said second sides of adjacent disks and radiate in a spoke-shaped configuration relative said axis of rotation of said axle.

8. The mobile machine as set forth in claim 7, wherein said uprooting means further includes:

tines of each of said set of tines which engage the ground at substantially the same angle.

9. A mobile machine as set forth in claim 3, wherein said plurality of secondary axles includes:

a first secondary axle of said plurality of secondary axles, said first secondary axle being disposed adjacent said uprooting means for receiving uprooted vegetation and soil attached to the uprooted vegetation from said uprooting means; and a second secondary axle of said plurality of secondary axles, said second secondary axle being disposed adjacent said collecting means for discharging uprooted uprooted vegetation into said collecting means after the separating of the soil from the vegetation.

10. A mobile machine as set forth in claim 3, wherein each of said radial arms is slightly inclined towards the direction of rotation of said radial arm about said axis of rotation of the secondary axle from which said inclined radial arm extends.

11. A mobile machine as set forth in claim 10, wherein each of said planar member includes:

four radial arms.

12. A mobile machine as set forth in claim 3, wherein each of said plurality of secondary axles further includes:

a rod means rigidly connected to the periphery of said secondary axle, said rod means being disposed around and in spaced parallel relationship relative said axis of rotation of said secondary axle for collecting soil between adjacent rods for inhibiting abrasive and corrosive wear to said secondary axle.

13. A mobile machine as set forth in claim 3, wherein both the distance of overlap between adjacent distal ends of said arms and the lateral distance between adjacent distal ends is within the range one-half to one and one-half inches.

14. A mobile machine as set forth in claim 3, further including:

wheel means for rotatably supporting the mobile machine;

conveyor means driven by the source of power, said conveyor means being disposed beneath said soil separating means and adjacent said collecting means for moving the soil separated from the uprooted vegetation laterally relative said soil separating means, said conveyor means transporting said separated soil to one side of the mobile machine in order to inhibit the sprinkling of soil onto said wheel means and for permitting said separated soil to be sprinkled to one side of the mobile machine in advance of the reverse passage of the mobile machine relative the ground.

15. A mobile machine as set forth in claim 3, wherein said collecting means further includes:

an open-top container, said open-top of said container being disposed beneath said second end of said soil separating means;

a sloping baffle means disposed within said container for guiding the uprooted vegetation discharged into said container away from one side of said container;

hinge means connecting said container to said frame for permitting hinging of said container relative said frame, such that when said container is pivoted relative said frame, the uprooted vegetation pours from said container; and hydraulic means extending between said container and said frame for controllably pivoting said container relative said frame for unloading the uprooted vegetation from said container.

16. The mobile machine of claim 3, wherein said distal end of said times of said uprooting means further define a plurality of cavities for trapping soil within said cavities means for inhibiting abrasive and corrosive effect of the soil on the tines.

* * * * *